United States Patent

Migita

[11] Patent Number: 5,915,118
[45] Date of Patent: *Jun. 22, 1999

[54] APPARATUS AND METHOD FOR GRADUALLY SHUTTING DOWN A POWER SUPPLY

[75] Inventor: Koji Migita, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/585,689

[22] Filed: Jan. 16, 1996

[30] Foreign Application Priority Data

Mar. 28, 1995 [JP] Japan .................................. 7-069427

[51] Int. Cl.$^6$ ...................................................... G06F 1/32
[52] U.S. Cl. ............................ 395/750.01; 395/750.07; 395/750.08; 365/228
[58] Field of Search ............................... 395/750, 750.01, 395/750.02, 750.08, 750.06, 750.07; 320/48, 49; 307/64, 65, 66; 365/226, 228, 229; 364/492

[56] References Cited

U.S. PATENT DOCUMENTS

| 5,148,043 | 9/1992 | Hirata et al. | 307/66 |
| 5,216,357 | 6/1993 | Coppola et al. | 324/142 |
| 5,295,078 | 3/1994 | Stich et al. | 364/483 |
| 5,600,229 | 2/1997 | Oh | 320/48 |

FOREIGN PATENT DOCUMENTS

| 61-97730 | 5/1986 | Japan . |
| 5-346830 | 12/1993 | Japan . |
| 6-161610 | 6/1994 | Japan . |

*Primary Examiner*—Ayaz R. Sheikh
*Assistant Examiner*—Ario Etienne
*Attorney, Agent, or Firm*—Staas & Halsey

[57] ABSTRACT

An uninterruptive power supply supplies electric power to a computer by use of a battery when the supply of electric power by a main power supply is interrupted. The system termination processing section detects the outage of the main power supply when the period of interruption of the supply of electric power from the main power supply to the uninterruptive power supply has exceeded a preset period, monitors the remaining capacity of the battery in the uninterruptive power supply at least when the outage is detected, gradually effects the system terminating process to the shutdown of the power supply of the system according to the degree of importance based on the remaining capacity of the battery, and controls the stage of the system terminating process according to a variation in the remaining capacity of the battery when the remaining capacity of the battery is changed during the system terminating process.

17 Claims, 9 Drawing Sheets

FIG. 7

| PROCESS NUMBER | CONTENT OF PROCESS | REMAINING BATTERY CAPACITY |
|---|---|---|
| I | G1 ~ G4 | LARGE |
| II | G2 ~ G4 | ↕ |
| III | G3 ~ G4 | |
| IV | G4 | SMALL |

FIG. 9

| PROCESS NUMBER | CONTENT OF PROCESS | REMAINING BATTERY CAPACITY |
|---|---|---|
| I | H1 ~ H5 | LARGE |
| II | H2 ~ H5 | ↑ |
| III | H3 ~ H5 | ↕ |
| IV | H4 ~ H5 | ↓ |
| V | H5 | SMALL |

APPARATUS AND METHOD FOR GRADUALLY SHUTTING DOWN A POWER SUPPLY

BACKGROUND OF THE INVENTION

1. Field of the Invention

This invention relates to a system terminating process effected at the time of power failure or outage in a system for protecting a computer from the outage by use of an uninterruptive power supply having a battery, and more particularly to a system termination processing method and device for improving the operation efficiency of the uninterruptive power supply.

2. Description of the Related Art

For example, in order to stably hold data, a computer known as a network server is connected to an uninterruptive power supply having a battery to protect data from being destroyed at the time of outage in many cases.

Conventionally, in the system terminating process effected at the time of outage in a system using the uninterruptive power supply, the "emergency system terminating process" was effected as the emergency process only when the remaining capacity of the battery in the uninterruptive power supply was reduced to an extremely small value. The emergency system terminating process saves information relating to data held in the respective portions of the system, memory contents, the states of the respective portions of the system which may be destroyed by the stoppage of electric power supply into a storage device such as an external storage device in which the content will not be destroyed even if no electric power is supplied, and then, shuts off the power supply of the computer.

In the above emergency system terminating process, the monitoring operation of, for example, comparing the remaining capacity of the battery in the uninterruptive power supply with the electric power necessary for processing the unprocessed portion of the system terminating process was not effected. Therefore, even if the supply of electric power of the power supply was recovered during the system terminating process, the system terminating process was completely effected until the power supply of the system was shut off.

Further, even if the power supply was recovered after the power supply of the computer was interrupted by the emergency system terminating process and the supply of electric power of the power supply was recovered, the system could not be used again if the power supply of the computer was not manually turned ON.

As described above, conventionally, in the system using the uninterruptive power supply, the system terminating process effected at the time of outage, the emergency system terminating process which is an emergency process was effected only when the remaining capacity of the battery in the uninterruptive power supply became extremely small, and the control operation was not effected by reference to the remaining capacity of the battery in the uninterruptive power supply together with the execution stage of the system terminating process. Therefore, even if the power supply was recovered during the system terminating process, the power supply of the system was shut off by the system terminating process. Further, when the power supply was recovered after the power supply of the computer was shut off by the emergency system terminating process, the power supply of the computer was turned ON by the manual operation.

That is, in the conventional system terminating process, only when the remaining capacity of the battery in the uninterruptive power supply became less than a preset value, the system terminating process was effected. For this reason, the amount of electric power which could be supplied until the supply of electric power to the system was completely stopped or time taken until the supply of electric power was stopped was determined by the preset value of the remaining capacity of the battery for starting the system terminating process. Therefore, whether all of the processes (for saving entire information which might be destroyed by the outage) of the system terminating process could be effected or only the minimum amount of processes (for saving the most important information of minimum amount which could not be recovered by the other process) of the system terminating process could be effected was practically determined according to the preset value of the remaining capacity of the battery for starting the system terminating process. Further, when the power supply was restored and the supply of electric power was recovered during the system terminating process, the system had to be restarted after the system terminating process was first completely effected. When the power supply was restored and the supply of electric power was recovered after the power supply of the computer was shut off by the system terminating process, the operator was required to turn ON the power supply in order to restart the system.

SUMMARY OF THE INVENTION

An object of this invention is to provide a system termination processing method and device capable of monitoring the relation between the remaining capacity of a battery and the rate of the unprocessed portion of the system terminating process and effecting an optimum system terminating process according to the remaining capacity of the battery at the monitoring time.

Another object of this invention is to provide a system termination processing method and device capable of restarting the system without shutting off the power supply when the supply of electric power is recovered during the system terminating process.

Still another object of this invention is to provide a system termination processing method and device capable of automatically restarting the system when the supply of electric power is recovered after the power supply of a computer was shut off after completion of the system terminating process.

A system termination processing method according to the first aspect of this invention comprises an outage detecting step of detecting the outage of a main power supply in a system which is supplied with electric power from the main power supply via the uninterruptive power supply; a battery monitoring step of monitoring the remaining capacity of the battery in the uninterruptive power supply when the outage is detected by the outage detecting step; a termination processing step of gradually effecting the system termination process to the shutdown of the power supply of the system according to the degree of importance based on information on the remaining capacity of the battery obtained in the battery monitoring step; and a stage control step of controlling the stage of the system terminating process according to a variation in the information on the remaining capacity of the battery when the information on the remaining capacity of the battery obtained in the battery monitoring step is changed during the termination processing step.

The stage control step may include a recovering step of interrupting the system terminating process and restoring the system when the supply of electric power from the main power supply is recovered before shutdown of the power supply of the system.

The recovering step may include a restarting step of restarting the system to recover the system.

The restarting step may include a step of restarting the system when the supply of electric power from the main power supply is recovered after shutdown of the power supply of the system.

A system termination processing device according to the second aspect of this invention comprises an outage detecting section provided in a system which is supplied with electric power from a main power supply via an uninterruptive power supply having a battery, for detecting the outage of the main power supply; a battery monitoring section for monitoring the remaining capacity of the battery in the uninterruptive power supply when the outage is detected by the outage detecting section; a termination processing section for gradually effecting the system termination process to the shutdown of the power supply of the system according to the degree of importance based on information on the remaining capacity of the battery obtained in the battery monitoring section; and a stage control section for controlling the stage of the system terminating process according to a variation in the information on the remaining capacity of the battery when the information on the remaining capacity of the battery obtained in the battery monitoring section is changed during the operation of the termination processing section.

The system termination processing device may further include a restarting section for restarting the system when the supply of electric power from the main power supply is recovered after shutdown of the power supply of the system.

The stage control section may include a recovering section for interrupting the system terminating process and restoring the system when the supply of electric power from the main power supply is recovered before shutdown of the power supply of the system.

The recovering section may include a restarting section for restarting the system to recover the system.

The restarting section may include a section for restarting the system when the supply of electric power from the main power supply is recovered after shutdown of the power supply of the system.

In the system termination processing method and device of this invention, the termination process is gradually effected by comparing the remaining capacity of the battery with the remaining amount of the terminating process when the system terminating process is effected at the time of interruption of the supply of electric power from the main power supply so that an optimum process can be effected according to the remaining capacity of the battery at the time of comparison.

Further, in the system termination processing method and device of this invention, the system can be immediately restarted without shutting off the power supply when the supply of electric power is recovered during the system terminating process. Also, in the system termination processing method and device of this invention, the system can be automatically restarted without any operator's operation when the supply of electric power is recovered after the power supply of the computer is shut off after completion of the system terminating process.

BRIEF DESCRIPTION OF THE DRAWINGS

Other objects and advantages of the invention will become apparent during the following discussion in conjunction with the accompanying drawings, in which:

FIG. 7 is a table for illustrating the content of the step-wise system termination process in the system termination processing device of FIG. 4;

FIG. 9 is a table for illustrating the content of the step-wise system termination process in the system termination processing device of FIG. 8.

DETAILED DESCRIPTION OF THE PREFERRED EMBODIMENTS

There will now be described embodiments of this invention with reference to the accompanying drawings.

First Embodiment

Figure 1:
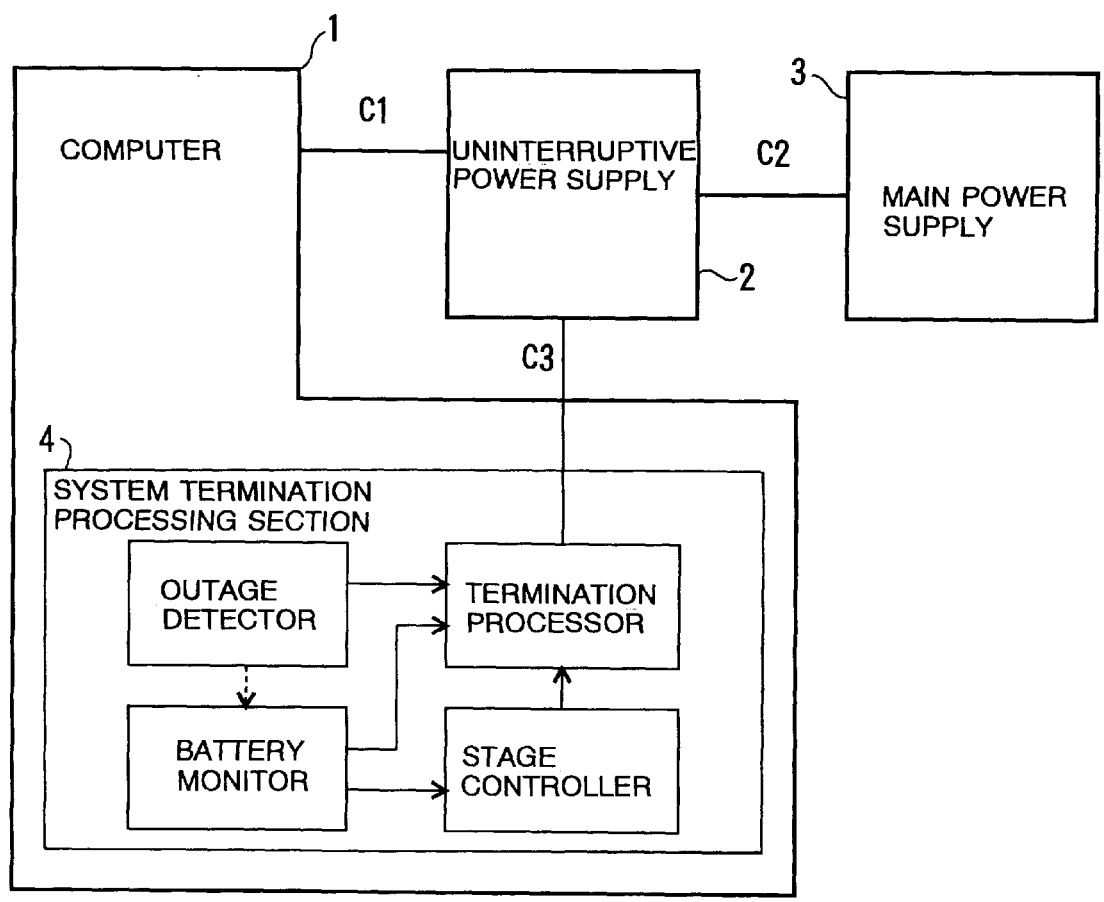
FIG. 1 is a block diagram showing the construction of a system having a system termination processing device according to a first embodiment of this invention.

The construction of a system to which a principle system termination processing device according to a first embodiment of this invention is applied is shown in FIG. 1.

The system of FIG. 1 includes a computer 1, uninterruptive power supply 2, and main power supply 3, and a system termination processing section 4 for effecting the system terminating process according to this invention is provided in the computer 1.

Electric power is supplied from the uninterruptive power supply 2 to the computer 1 via a power supply cable C1 and electric power is supplied to the uninterruptive power supply 2 via a power supply cable C2 from the main power supply 3.

The uninterruptive power supply 2 contains a battery (not shown) for back-up of the power supply, and when the supply of electric power by the main power supply 3 such as a commercial power supply is interrupted, for example, by the power failure or outage, the electric power is supplied to the computer 1 by use of the battery. Further, a power supply control signal containing a battery voltage and the like is supplied from the uninterruptive power supply 2 to the system termination processing section 4 via a power supply control cable C3.

Although not shown in detail in the drawing, the system termination processing section 4 substantially includes an outage detecting section, battery monitoring section, termination processing section and stage control section.

The outage detecting section detects the outage of the main power supply 3 by detecting that the period of interruption of the supply of electric power from the main power supply 3 to the uninterruptive power supply 2 has exceeded a preset period. The battery monitoring section monitors the remaining capacity of the battery in the uninterruptive power supply 2 at least when the outage is detected by the outage detecting section. The remaining capacity of the battery is detected based on a variation in the terminal voltage of the battery, for example. The termination processing section is initiated with the detection of the outage by the outage detecting section and gradually effects the system terminating process to the shutdown of the power supply of the system according to the degree of importance based on information on the remaining capacity of the battery of the battery monitoring section at the time of the detection of the outage. The stage control section controls the stage of the system terminating process of the termination processing section according to a variation in the information on the remaining capacity of the battery by the battery monitoring section when the variation in the information on the remaining capacity of the battery by the battery monitoring section is detected during the operation of the termination processing section.

Figure 2:
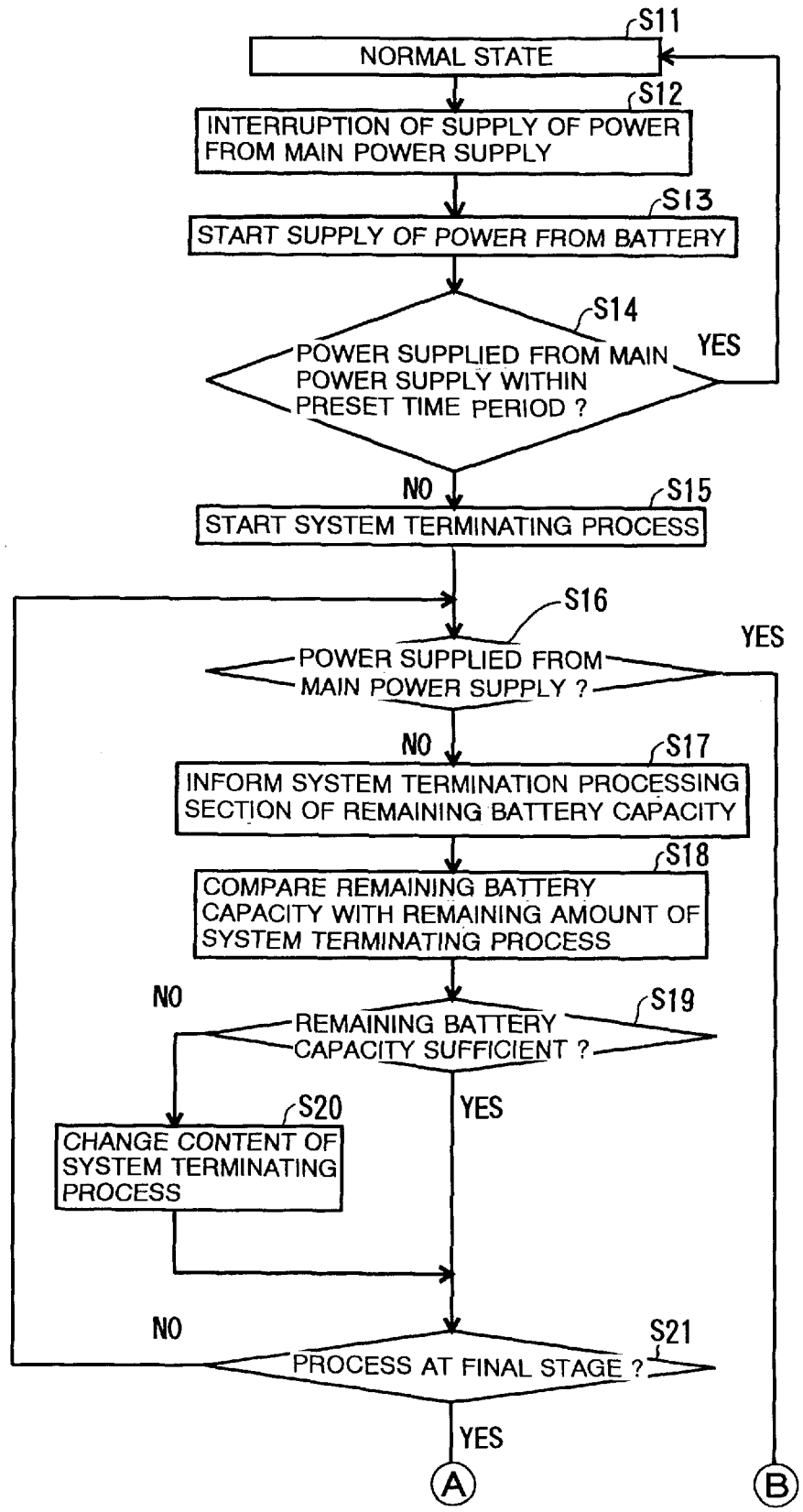
FIG. 2 is a first half portion of a flowchart for illustrating the operation of the system termination processing device of FIG. 1.
Figure 3:
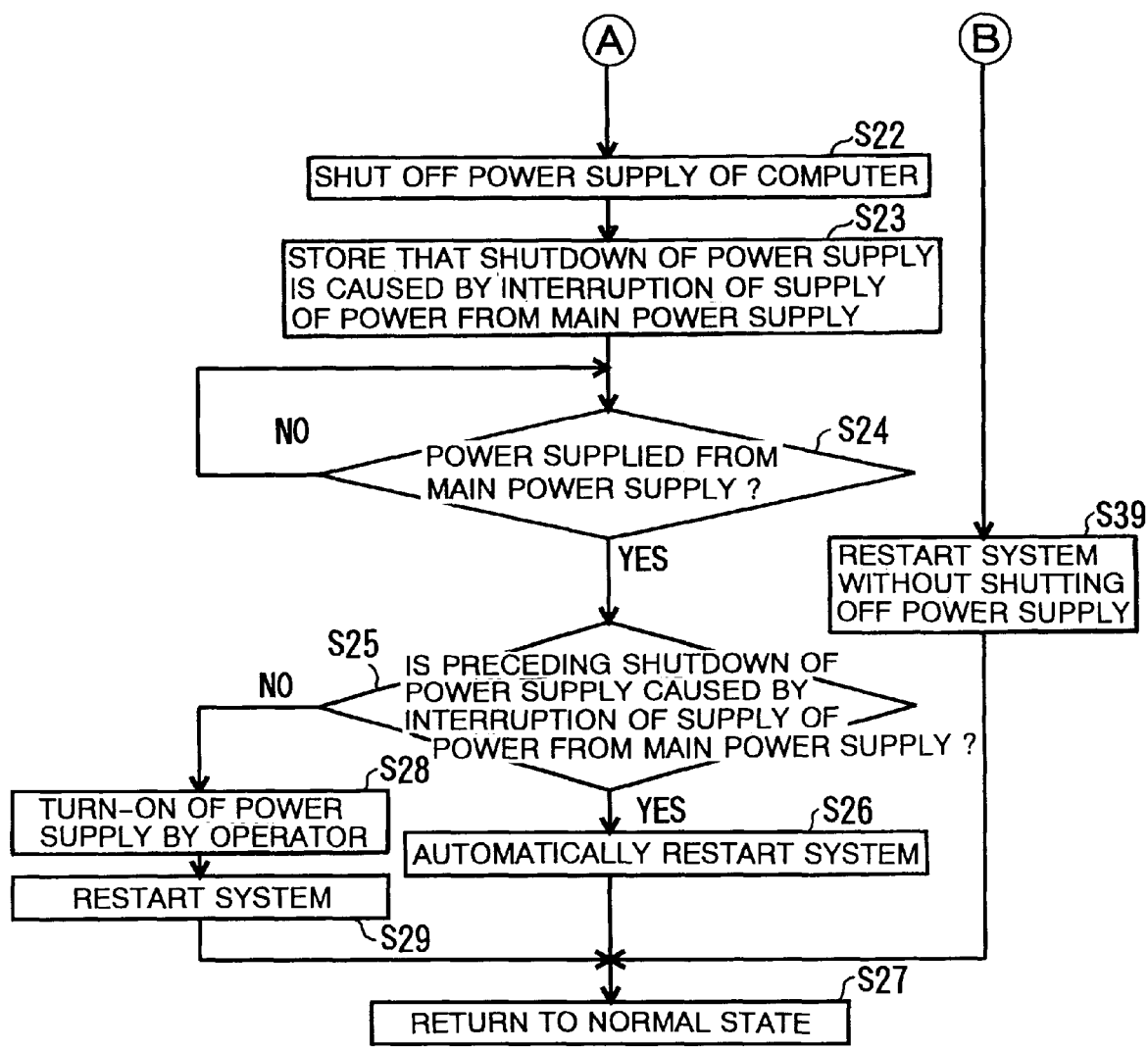
FIG. 3 is a latter half portion of a flowchart for illustrating the operation of the system termination processing device of FIG. 1.

Next, the operation of the system shown in FIG. 1 is explained with reference to the flowchart shown in FIGS. 2 and 3.

First, in the normal operation state (step S11), if the supply of electric power from the main power supply 3 to the uninterruptive power supply 2 via the power supply cable C2 is interrupted (step S12), the supply of electric power from the battery provided in the uninterruptive power supply 2 to the computer 1 via the power supply cable C1 is started (step S13).

Information relating to interruption of the supply of electric power from the main power supply 3 is supplied from the uninterruptive power supply 2 to the system termination processing section 4 via the power supply control cable C3 and whether or not the supply of electric power from the main power supply 3 is restarted within a predetermined time period is checked by the outage detecting section (step S14).

If it is detected in the step S14 that the supply of electric power from the main power supply 3 is restarted within a predetermined time period, the process is returned to the step S11 of normal state. Therefore, in the case of so-called temporary outage or momentary power failure of the power supply, it can be substantially neglected and an erroneous operation will not be caused by the temporary outage.

If the outage detecting section detects in the step S14 that the supply of electric power from the main power supply 3 is not restarted within a preset time period, the termination processing section of the system termination processing section 4 starts the system terminating process (step S15).

When the system terminating process is started, whether the supply of electric power from the main power supply 3 via the power supply cable C2 is restarted or not is checked (S16), and if the supply of electric power from the main power supply 3 is not restarted, the remaining capacity of the battery in the uninterruptive power supply 2 is informed to the battery monitoring section of the system termination processing section 4 via the power supply control cable C3 (step S17). If the stage control section of the system termination processing section 4 compares the remaining capacity of the battery with the degree of progress of the system terminating process (step S18) to determine whether the remaining capacity of the battery is still sufficiently large or not (step S19).

If it is determined in the step S19 that the remaining capacity of the battery is not sufficiently large for the present stage of the system terminating process, the stage control section changes the stage of the system terminating process according to the remaining capacity of the battery (step S20). After the step S20, if it is determined in the step S19 that the remaining capacity of the battery is still sufficiently large, whether the terminating process has reached the final stage or not is determined (step S21), and if it has not reached the final stage, the step S16 is effected again.

If it is determined in the step S21 that the terminating process has reached the final stage, the termination processing section of the system termination processing section 4 shuts off the power supply of the computer 1 (step S22). Then, the system termination processing section 4 stores that the operation of the computer 1 is interrupted by interruption of the supply of electric power from the main power supply 3 (step S23).

Next, whether the supply of electric power from the main power supply 3 is started again or not is checked (step S24) and the checking operation of the step S24 is repeatedly effected until the supply of electric power from the main power supply 3 is restarted.

If the supply of electric power from the main power supply 3 is restarted, whether or not the cause of the preceding interruption of the power supply is interruption of the supply of electric power from the main power supply 3 is checked (step S25), and if it is determined that the preceding interruption of the power supply is caused by interruption of the supply of electric power from the main power supply 3, the system of the computer 1 is automatically restarted (step S26) and then the normal state is recovered (step S27). If it is determined in the step S25 that the preceding interruption of the power supply is not caused by interruption of the supply of electric power from the main power supply 3, the power supply is kept interrupted and the system is not restarted unless the operator turns ON the power supply by manual operation. If the operator turns ON the power supply (step S28), the system is restarted (step S29), then the step S27 is effected, and the normal state is recovered.

If it is determined in the step S16 that the supply of electric power from the main power supply 3 is restarted, the system termination processing section 4 restarts the system without shutting off the power supply (step S30), the step S27 is effected and the normal state is recovered.

Thus, during the system terminating process is effected at the time of interruption of the supply of electric power due to outage, for example, the remaining capacity of the battery and the remaining amount of the terminating process are compared and a process which is optimum at this time is effected. Further, in a case where the outage occurs during the system terminating process, the system can be immediately restarted. In addition, the system can be restarted without operator's operation when the supply of electric power is recovered after completion of the system terminating process.

Second Embodiment

Figure 4:
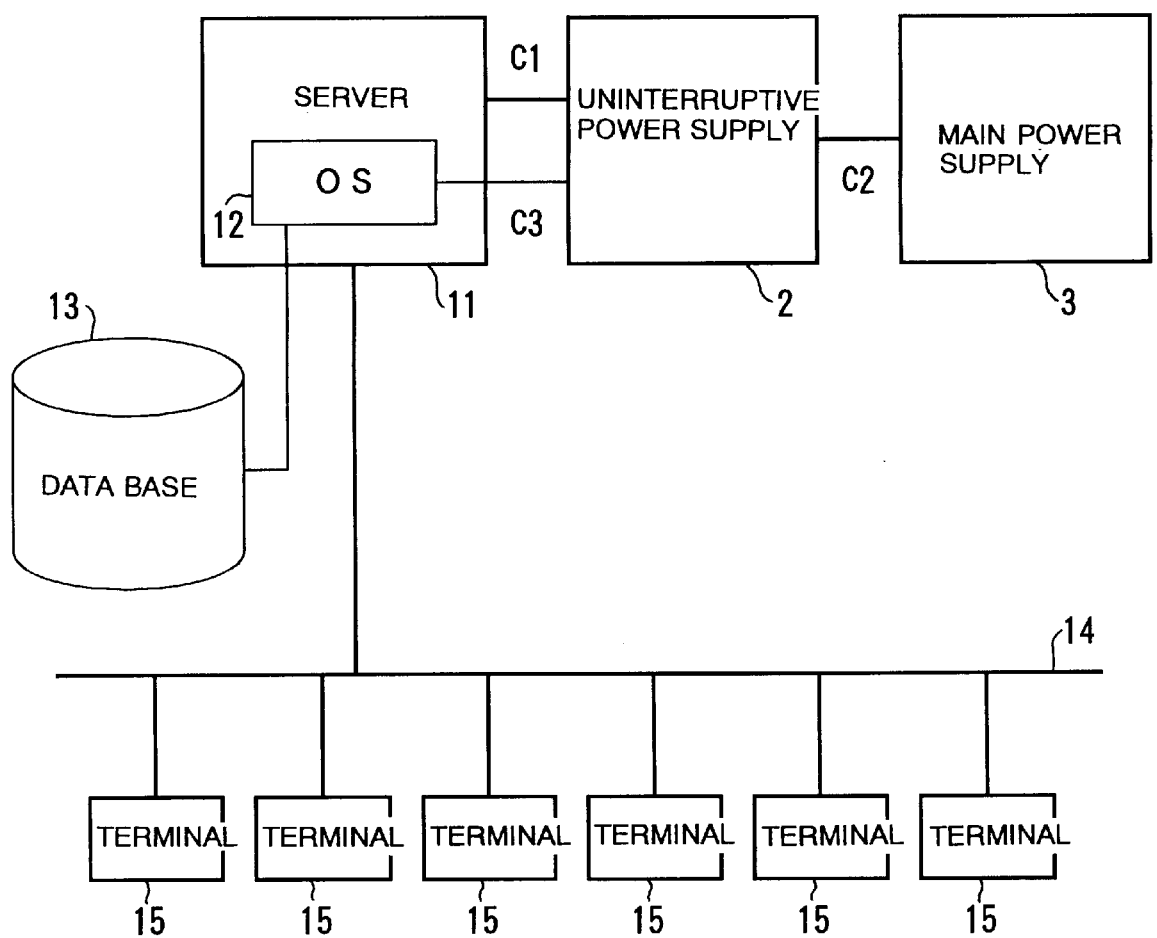
FIG. 4 is a block diagram showing the construction of a system having a system termination processing device according to a second embodiment of this invention.

The construction of a network system constructing a data base environment on the server by applying a system termination processing device according to the second embodiment of this invention is shown in FIG. 4. In FIG. 4, portions which are the same as corresponding portions of FIG. 1 are denoted by the same reference numerals and the explanation therefor is omitted.

The system of FIG. 4 includes a server 11, uninterruptive power supply 2 and main power supply 3, and the server 11 includes an operating system section (which is hereinafter referred to as an "OS section") having a system termination processing function for executing the system terminating process of this invention. Further, the system of FIG. 4 includes a data base section 13, network section 14 and client terminals 15.

The OS section 12 is constructed by an operating system (OS) operated on the server 11, for example, substantially constructed by UNIX, and the data base section 13 is constructed by a software executed on the OS section 12 and an adequate storage device.

The server 11 is a computer such as a work station functioning as a server of the network section 14 and is typically constructed as a so-called UNIX server, for example. The network section 14 is constructed with a plurality of client terminals 15 for the server 11.

The OS section 12 substantially has a function of the system termination processing section 4 of FIG. 1. That is, although not specifically shown in the drawing, the OS section 12 substantially has an outage detecting function for detecting the outage of the main power supply when detecting that the period of interruption of the supply of electric power from the main power supply 3 to the uninterruptive power supply 2 has exceeded a preset period, a battery monitoring function for monitoring the remaining capacity of the battery in the uninterruptive power supply 2 at least when the outage is detected by the outage detecting function, a termination processing function initiated with the detection of the outage by the outage detecting function and for gradually effecting the system shutdown process to the shutdown of the power supply of the system according to the degree of importance based on information on the remaining capacity of the battery obtained by the battery monitoring function at the time of the detection of the outage, and a stage control function for controlling the stage of the system terminating process according to a variation in information on the remaining capacity of the battery when the variation in information on the remaining capacity of the battery obtained by the battery monitoring function occurs during the shutdown operation of the termination processing function.

Figure 5:
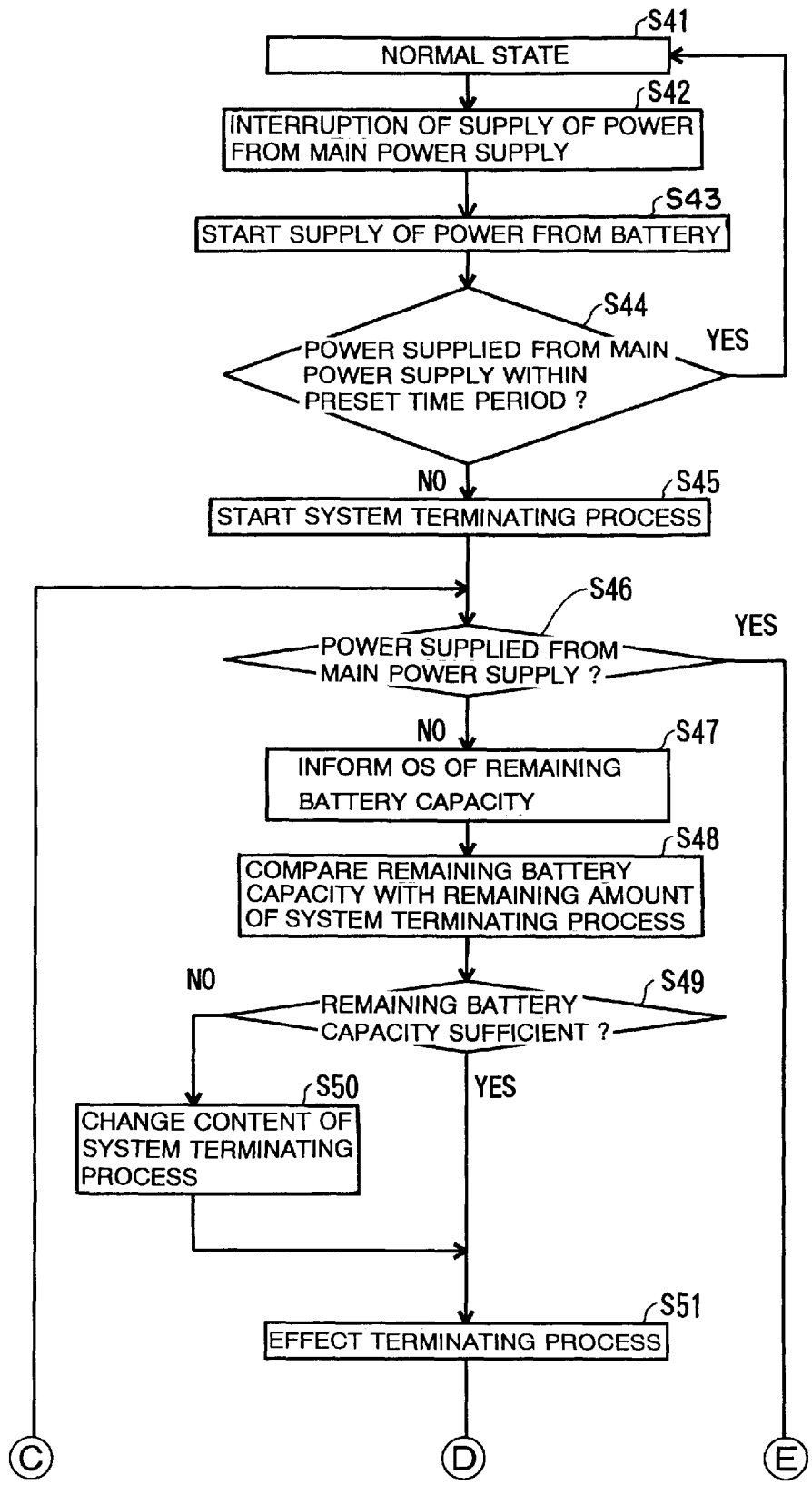
FIG. 5 is a first half portion of a flowchart for illustrating the operation of the system termination processing device of FIG. 4.
Figure 6:
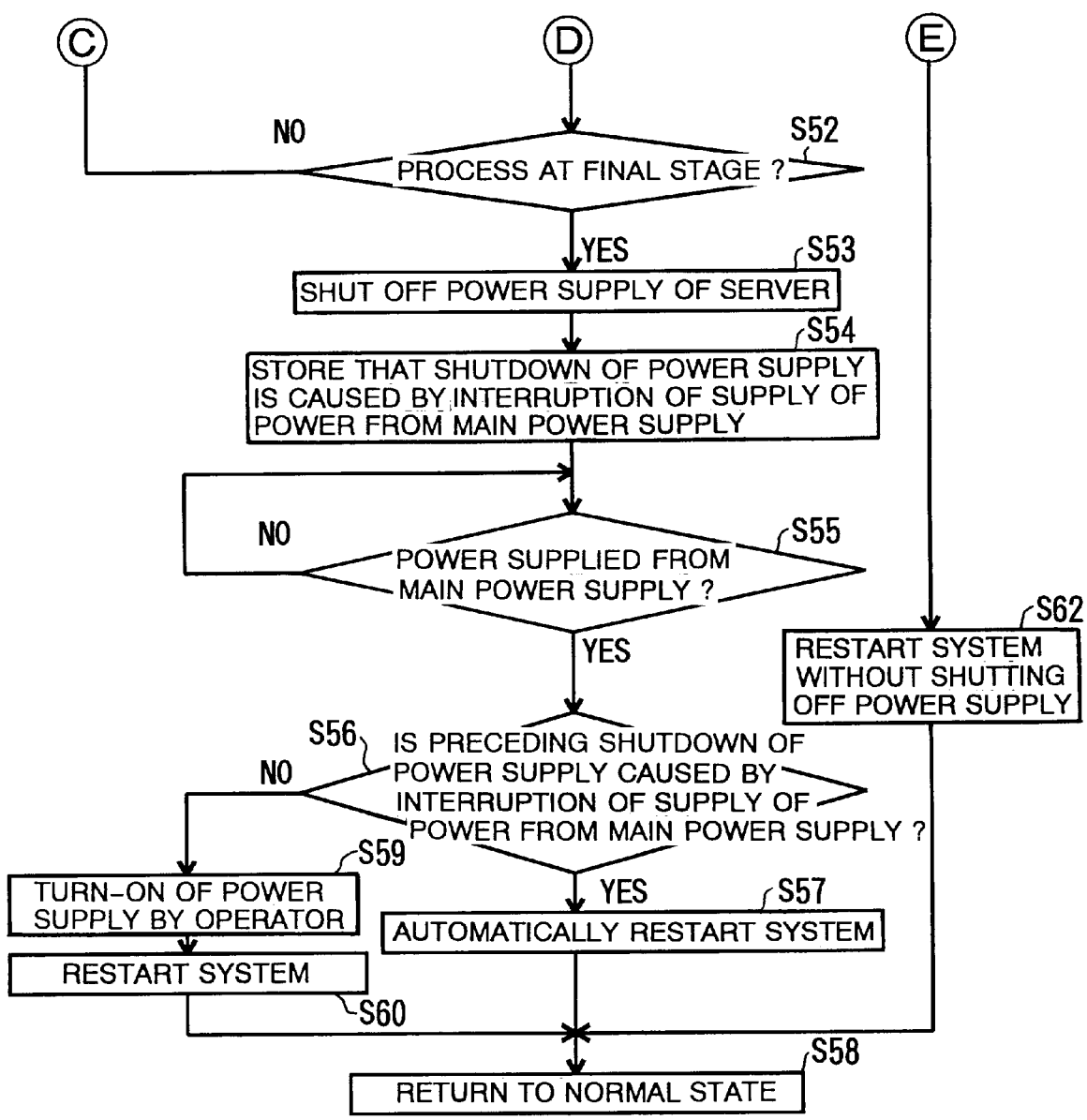
FIG. 6 is a latter half portion of a flowchart for illustrating the operation of the system termination processing device of FIG. 4.

Next, the operation of the system with the construction of FIG. 4 is explained with reference to the flowchart shown in FIGS. 5 and 6. The operation shown in the flowchart of FIGS. 5 and 6 is substantially based on the flowchart shown in FIGS. 2 and 3 and is more concretely illustrated.

First, in the normal operating condition (step S41), if the supply of electric power from the main power supply 3 to the uninterruptive power supply 2 via the power supply cable C2 is interrupted (step S42), the supply of electric power from the battery contained in the uninterruptive power supply 2 to the server 11 via the power supply cable C1 is started (step S43).

Information on interruption of the power supply from the main power supply 3 is supplied to the OS section 12 via the power supply control cable C3 and whether or not the supply of electric power from the main power supply 3 can be restarted within a preset time period is determined by the outage detecting function (step S44).

If it is determined in the step S44 that the supply of electric power from the main power supply 3 is restarted within the preset time period, the process returns to the normal state of the step S41. Therefore, in the case of so-called temporary outage or momentary power failure of the power supply, it can be substantially neglected and an erroneous operation will not be caused by the temporary outage.

If the outage detecting function detects in the step S44 that the supply of electric power from the main power supply 3 is not restarted within the preset time period, the system terminating process for shutting off the system is started by the termination processing function of the OS section 12 (step S45).

In this case, the contents of the system terminating process are divided into the following four stages (G1) to (G4).

(G1): Inhibit access to the data base section 13 and write the content of the memory relating to the data base section 13 into a hard disk which is a storage device in which the storage content can be kept stored even at the time of interruption of the supply of electric power.

(G2): Write data of the OS section 12 which is stored in the memory into the hard disk.

(G3): Interrupt the process on the network 14.

(G4): Permit the OS section 12 to effect the system terminating process of the server 11.

Since the priority of the four stages (G1) to (G4) is higher with respect to the timing as the suffix attached thereto is smaller, the relation between the remaining capacity of the battery and the content of the process is set such that the process number becomes smaller as the remaining capacity of the battery becomes larger (for example, the battery voltage becomes higher) as shown in FIG. 7. That is, the relation is as follows.

In the process number I, the remaining capacity of the battery is sufficiently large and all of the processes (G1) to (G4) are effected.

In the process number II, the remaining capacity of the battery is slightly large and the processes (G2) to (G4) are effected.

In the process number III, the remaining capacity of the battery is slightly small and the processes (G3) and (G4) are effected.

In the process number IV, the remaining capacity of the battery is relatively small and only the process (G4) is effected.

When the system terminating process is started, whether the supply of electric power from the main power supply 3 via the power supply cable C2 is restarted or not is checked (step S46), and if the supply of electric power from the main power supply 3 is not restarted, the remaining capacity of the battery in the uninterruptive power supply 2 is informed to the battery monitoring function of the OS section 12 via the power supply control cable C3 (step S47). The stage control function of the OS section 12 compares the remaining capacity of the battery with the degree of progress of the system terminating process (step S48) to determine whether the remaining capacity of the battery is still sufficiently large or not (step S49).

If it is determined in the step S49 that the remaining capacity of the battery is not sufficiently large for the present stage of the system terminating process, the stage control function changes the stage of the system terminating process according to the remaining capacity of the battery (step S50). After the step S50, if it is determined in the step S49 that the remaining capacity of the battery is still sufficiently large, the system terminating process is effected (step S51) and then whether the terminating process has reached the final stage or not is determined (step S52), and if it has not reached the final stage, the step S46 is effected again.

If it is determined in the step S52 that the terminating process has reached the final stage, the termination processing function of the OS section 12 shuts off the power supply of the server 11 (step S53). Then, the OS section 12 stores that the operation of the server 11 is interrupted by interruption of the supply of electric power from the main power supply 3 (step S54).

Next, whether the supply of electric power from the main power supply 3 is started again or not is checked (step S55) and the checking operation of the step S55 is repeatedly effected until the supply of electric power from the main power supply 3 is started again.

If the supply of electric power from the main power supply 3 is started again, whether or not the cause of the preceding shutdown of the power supply is interruption of the supply of electric power from the main power supply 3 is checked (step S56), and if it is determined that the preceding shutdown of the power supply is caused by interruption of the supply of electric power from the main power supply 3, the system of the server 11 is automatically restarted (step S57) and then the normal state is recovered (step S58). If it is determined in the step S56 that the preceding shutdown of the power supply is not caused by interruption of the supply of electric power from the main power supply 3, the operator turns ON the power supply (step S59) to restart the system (step S60), and then the step S58 is effected and the normal state is recovered.

If it is determined in the step S46 that the supply of electric power from the main power supply 3 is restarted, the method of restarting the system is determined according to the rate of the already processed portion of the system terminating process (step S61), and then, the OS section 12 restarts the system without shutting off the power supply (step S62), the step S58 is effected and the normal state is recovered.

When the restarting method is determined in the step S61, for example, one of the following two methods can be used.

(1) The restarting process is effected for every preset stages according to the execution stage of the terminating process at the restarting time.

(2) The restarting process is sequentially effected in a reverse order from the process which has been completed at the immediately preceding time according to the execution stage of the terminating process at the restarting time.

Thus, when the system terminating process is effected at the time of interruption of the supply of electric power due to outage, for example, the remaining capacity of the battery and the remaining amount of the terminating process are compared and a process which is optimum at this time is effected. Further, in a case where the outage occurs during the system terminating process, the system can be immediately restarted. In addition, the system can be restarted without operator's operation when the supply of electric power is recovered after completion of the system.

Third Embodiment

Figure 8:
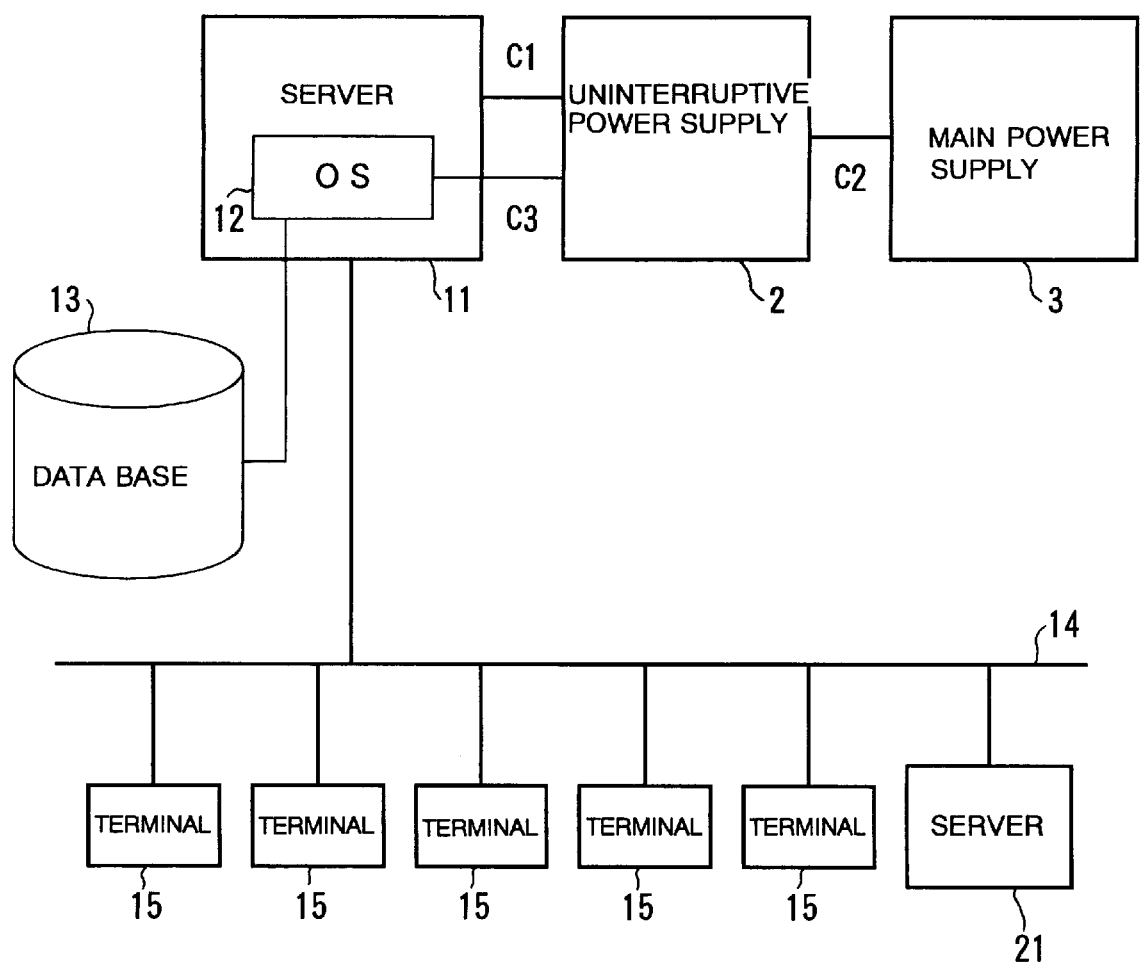
FIG. 8 is a block diagram showing the construction of a system having a system termination processing device according to a first embodiment of this invention.

The construction of a network system constructing a data base environment on the server by applying a system termination processing device according to the third embodiment of this invention is shown in FIG. 8. In FIG. 8, portions which are the same as corresponding portions of FIG. 1 are denoted by the same reference numerals and the explanation therefor is omitted.

The system of FIG. 8 includes a first server 11, uninterruptive power supply 2 and main power supply 3, and the first server 11 includes an OS section having a system termination processing function for executing the system terminating process according to this invention. Further, the system of FIG. 8 includes a data base section 13, network section 14, a plurality of client terminals 15, and second server 21.

The OS section 12 is constructed by an operating system (OS) operated on the first server 11, for example, substantially constructed by UNIX, and the data base section 13 is constructed by a software executed on the OS section 12 and an adequate storage device.

The first server 11 is a computer such as a work station functioning as a server of the network section 14 and is typically constructed as a so-called UNIX server, for example. The network section 14 has a plurality of client terminals 15 for the server 11 and is constructed as a network such as WAN (Wide Area Network) or LAN (Local Area Network).

The second server 21 is a computer such as a work station connected on the network section 14 and functioning as a server of the network section 14 and is typically constructed as a so-called UNIX server, for example. Below the layer of the second server 21, a network section such as WAN or LAN having substantially the same construction as the network section 14, although not shown in the drawing, and having a plurality of client terminals which treat the server 21 as their server and is constructed as a network such as WAN (Wide Area Network) or LAN (Local Area Network).

In this case, the content of the system terminating process of the above system is different from that of the system of FIG. 4.

That is, the contents of the system terminating process are divided into the following five stages (H1) to (H5).

(H1): Inhibit access to the data base section 13, and at the same time, give information on the inhibition of access to the second server 21 on the network section 14.

(H2): Write the content of the memory relating to the data base section 13 into the hard disk.

(H3): Write data of the OS section 12 which is stored in the memory into the hard disk.

(H4): Interrupt the process on the network 14.

(H5): Permit the OS section 12 to effect the system terminating process of the server 11.

Since the priority of the five stages (H1) to (H5) is higher with respect to the timing as the suffix attached thereto is smaller, the relation between the remaining capacity of the battery and the content of the process is set such that the process number will become smaller as the remaining capacity of the battery becomes larger (for example, the battery voltage becomes higher) as shown in FIG. 9. That is, the relation is as follows.

In the process number I, the remaining capacity of the battery is sufficiently large and all of the processes (H1) to (H5) are effected.

In the process number II, the remaining capacity of the battery is slightly large and the processes (H2) to (H5) are effected.

In the process number III, the remaining capacity of the battery is slightly small and the processes (H3) to (H5) are effected.

In the process number IV, the remaining capacity of the battery is slightly smaller and the processes (H4) and (H5) are effected.

In the process number V, the remaining capacity of the battery is smallest and only the process (H5) is effected.

When the system terminating process is effected at the time of interruption of the supply of electric power due to outage, for example, the remaining capacity of the battery is compared with the remaining amount of the system terminating process and a process which is optimum at this time is selected and effected. Further, it becomes possible to immediately restart the system when outage occurs during the system terminating process. In addition, the system can be restarted without operator's operation when the supply of electric power is recovered after completion of the system.

It is apparent that, in this invention, a wide range of different working modes can be formed based on the invention without deviating from the spirit and scope of the invention.

What is claimed is:

1. A method for shutdown of an information processing system processing first data stored in a storage device, the information processing system receiving electric power from a main power supply and from a battery when the electric power is not received from the main power supply, said method comprising:

detecting an outage of the electric power from the main power supply;

monitoring remaining capacity of the battery when interruption of the electric power from the main power supply is detected;

determining a starting point for executing a series of processes for shutdown of the information processing system based on the remaining capacity of the battery monitored by said monitoring, the series of processes including
      a process of inhibiting access to the storage device,
      a process of storing second data in an external storage device, the second data relating to the first data stored in the storage device,
      a process of storing third data in the external storage device, the third data used for processing the first data stored in the storage device, and
      a final ending process of the series of processes to terminate operation of the information process system; and executing the series of processes from the process at the starting point to the final ending process.

2. A method according to claim 1, further comprising restarting the information processing system when the supply of electric power from the main power supply is recovered after shutdown of the information processing system.

3. A method according to claim 1, wherein said executing includes interrupting a currently executing process and restoring the information processing system when the electric power supply from the main power supply is recovered before the shutdown of the information processing system.

4. A method according to claim 3, further comprising restarting the information processing system when the supply of electric power form the main power supply is recovered after shutdown of the information processing system.

5. A method according to claim 3, wherein said recovering includes restarting the information processing system to recover the information processing system.

6. A method according to claim 5, wherein said restarting includes restarting the information processing system when the supply of electric power from the main power supply is recovered after shutdown of the information processing system.

7. A device for ending operation of an information processing system processing first data stored in a storage device, the information processing system receiving electric power from a main power supply and from a battery when the electric power is not received from the main power supply, said device comprising:

a detection unit to detect an outage of the electric power from the main power supply;

a monitoring unit, coupled to said detection unit, to monitor remaining capacity of the battery when interruption of the electric power from the main power supply is detected;

a determination unit, coupled to at least one of said detection unit and said monitoring unit, to determine a starting point for executing a series of processes for shutdown of the information processing system based on the remaining capacity of the battery monitored by said monitoring unit, the series of processes including
      a process of inhibiting access to the storage device,
      a process of storing second data in an external storage device, the second data relating to the first data stored in the storage device,
      a process of storing third data in the external storage device, the third data used for processing the first data stored in the storage device, and
      a final ending process of the series of processes to terminate operation of the information process system; and an execution unit, coupled to said determination unit and said monitoring unit, to execute the series of processes from the process at the starting point to the final ending process.

8. A device according to claim 7, further comprising a restarting unit to restart the information processing system when the supply of electric power from the main power supply is recovered after shutdown of the information processing system.

9. A device according to claim 7, wherein said execution unit includes a recovery unit for interrupting the currently executing process and restoring the information processing system when the supply of electric power from the main power supply is recovered before shutdown of the information processing system.

10. A device according to claim 9, further comprising a restarting unit to restart the information processing system when the supply of electric power from the main power supply is recovered after shutdown of the information processing system.

11. A device according to claim 9, wherein said recovery unit includes a restarting unit to restart the information processing system to recover the information processing system.

12. A device according to claim 11, wherein said restarting unit restarts the information processing system when the supply of electric power from the main power supply is recovered after shutdown of the information processing system.

13. A method according to claim 1, wherein the series of processes are processes that store a plurality of data in a memory in order of decreasing priority in response to the remaining capacity of the battery.

14. A method of ending operation of an information processing system which includes a server for processing first data stored in a database and a client terminal connected to the server via a network, the server being operated by receiving electric power from a main power supply and from a battery when the electric power from the main power supply is not received, said method comprising:

detecting an outage of the electric power from the main power supply;

monitoring remaining capacity of the battery when interruption of the electric power from the main power supply is detected;

determining a starting point for executing a series of processes for ending operation of the information processing system based on the remaining capacity of the battery monitored by said monitoring, the series of processes including
  a process of inhibiting access to the database,
  a process of storing second data in an external storage, the second data relating to the first data stored in the database,
  a process of storing third data in the external storage device, the third data used for processing the first data stored in the database,
  a process of ending communication between the server and the client terminal, and
  a final ending process of ending operation of the server; and executing the series of processes from the process at the starting point, determined by said determining, to the final ending process.

15. A method of ending operation of an information processing system which includes a first server for processing first data stored in a database, a client terminal connected to the first server via a network, and a second server connected to the first server and the network, the first server being operated by receiving electric power from a main power supply and from a battery when the electric power is not received from the main power supply, said method comprising at the first server:

detecting an outage of the electric power from the main power supply;

monitoring remaining capacity of the battery when interruption of the electric power from the main power supply is detected;

determining a starting point for executing a series of processes for ending operation of the information processing system based on the remaining capacity of the battery monitored by said monitoring, the series of processes including
  a process of inhibiting access to the database,
  a process of notifying the second server of inhibiting access to the database,
  a process of storing in an external storage device the first data stored in the database,
  a process of storing in the external storage device second data used for processing the first data stored in the database,
  a process of ending communication between the first server and the client terminal, and
  a final ending process of ending the operation of the first server, and executing the series of processes from the process at the starting point, determined by said determining, to the final ending process.

16. A system for of ending operation of an information processing system which includes a server for processing first data stored in a database and a client terminal connected to the server via a network, the server being operated by receiving electric power from a main power supply and from a battery when the electric power from the main power supply is not received, said system comprising:

a detection unit to detect an outage of the electric power from the main power supply;

a monitoring unit, coupled to said detection unit, to monitor remaining capacity of the battery when interruption of the electric power from the main power supply is detected;

a determination unit, coupled to at least one of said detection unit and said monitoring unit, to determine a starting point for executing a series of processes for ending operation of the information processing system based on the remaining capacity of the battery monitored by said monitoring unit, the series of processes including
  a process of inhibiting access to the database,
  a process of storing second data in an external storage, the second data relating to the first data stored in the database,
  a process of storing third data in the external storage device, the third data used for processing the first data stored in the database,
  a process of ending communication between the server and the client terminal, and
  a final ending process of ending operation of the server; and an execution unit, coupled to said detection unit and said monitoring unit, the series of processes from the process at the starting point, determined by said determination unit, to the final ending process.

17. A system for ending operation of an information processing system which includes a first server for processing first data stored in a database, a client terminal connected to the first server via a network, and a second server connected to the first server and the network, the first server being operated by receiving electric power from a main power supply and from a battery when the electric power is not received from the main power supply, said system comprising at the first server:

a detection unit to detect an outage of the electric power from the main power supply;

a monitoring unit, coupled to said detection unit, to monitor remaining capacity of the battery when interruption of the electric power from the main power supply is detected;

a determination unit, coupled to at least one of said detection unit and said monitoring unit, to determine a starting point for executing a series of processes for ending operation of the information processing system based on the remaining capacity of the battery monitored by said monitoring unit, the series of processes including
  a process of inhibiting access to the database,
  a process of notifying the second server of inhibiting access to the database,
  a process of storing in an external storage device the first data stored in the database,
  a process of storing in the external storage device second data used for processing the first data stored in the database,
  a process of ending communication between the first server and the client terminal, and
  a final ending process of ending the operation of the first server; and an execution unit, coupled to said detection unit and said monitoring unit, to execute the series of processes from the process at the starting point, determined by said determination unit, to the final ending process.

* * * * *

UNITED STATES PATENT AND TRADEMARK OFFICE
CERTIFICATE OF CORRECTION

PATENT NO. : 5,915,118
DATED : June 22, 1999
INVENTOR(S) : Koji Migita

It is certified that error appears in the above-indentified patent and that said Letters Patent is hereby corrected as shown below:

Col. 11, line 54, change "form" to -- from --.

Signed and Sealed this

Ninth Day of November, 1999

Attest:

Attesting Officer

Q. TODD DICKINSON

Acting Commissioner of Patents and Trademarks